United States Patent [19]
Potthoff

[11] Patent Number: 5,597,414
[45] Date of Patent: Jan. 28, 1997

[54] SPRAYER FOR COATING ARTICLES

[75] Inventor: Bernhard Potthoff, Herzebrock-Clarholz, Germany

[73] Assignee: Venjakob Maschinenbau GmbH & Co KG, Rheda-Wiedenbruck, Germany

[21] Appl. No.: 223,253

[22] Filed: Apr. 4, 1994

[30] Foreign Application Priority Data

Apr. 6, 1993 [DE] Germany .................. 43 11 310.9

[51] Int. Cl.⁶ .................................................. B05C 11/00
[52] U.S. Cl. .................. 118/70; 118/17; 118/324; 198/499
[58] Field of Search .................. 118/17, 70, 324, 118/110, 111, 366, DIG. 7; 198/495, 496, 498, 499

[56] References Cited

U.S. PATENT DOCUMENTS

| | | | |
|---|---|---|---|
| 2,655,865 | 10/1953 | Geiringer | 118/70 X |
| 3,111,430 | 11/1963 | Graf | 118/70 |
| 3,756,381 | 9/1973 | Janssen et al. | 198/498 X |
| 3,851,753 | 12/1974 | Lazzarini et al. | 198/498 |
| 4,155,442 | 5/1979 | Gosling et al. | 198/498 |
| 4,587,924 | 5/1986 | Reinlein et al. | 118/70 |
| 4,860,883 | 8/1989 | Knaul et al. | 198/495 |
| 4,915,211 | 4/1990 | Dohmeier | 198/499 |
| 5,113,999 | 5/1992 | Zeppenfeld | 198/499 X |
| 5,147,028 | 9/1992 | Raggi | 118/70 X |
| 5,302,202 | 4/1994 | Zimmer | 118/70 |

Primary Examiner—Robert J. Warden
Assistant Examiner—Krisanne M. Thornton
Attorney, Agent, or Firm— Sprung Horn Kramer & Woods

[57] ABSTRACT

A coating sprayer includes several sprayguns. The sprayguns are accommodated in an essentially solid-walled spraybooth. A conveyor with a motor-revolved belt conveys the articles through the spraybooth. A belt-wiping assembly extends across the belt and wipes its surface clean. The belt-wiping assembly includes a wiper that revolves around at least one axis. Since the axis is entirely or almost perpendicular to the surface of the belt, at least some of the wiper's active edge will contact the surface of the belt. The sprayer is intended for spraying such flat articles as furniture parts.

26 Claims, 8 Drawing Sheets

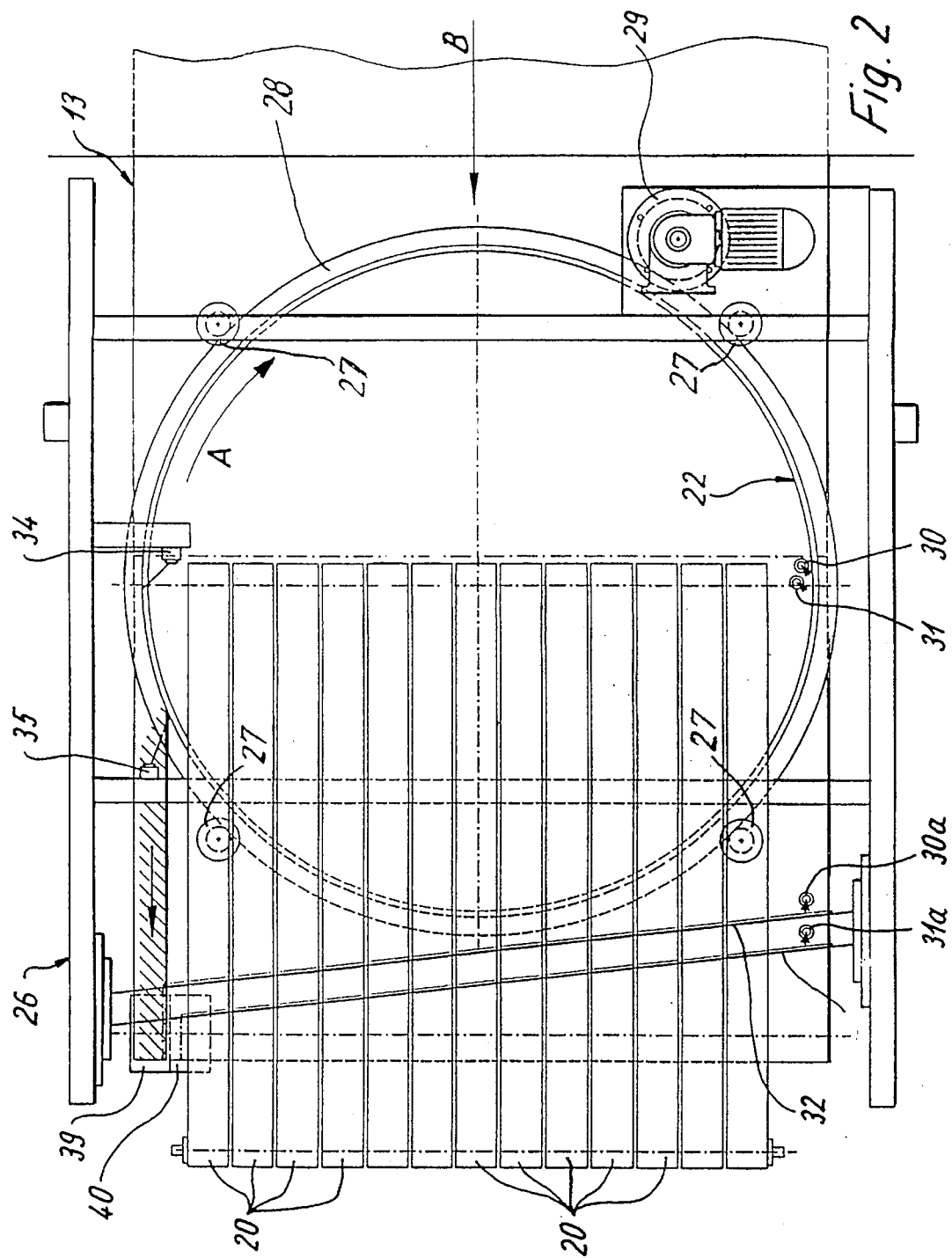

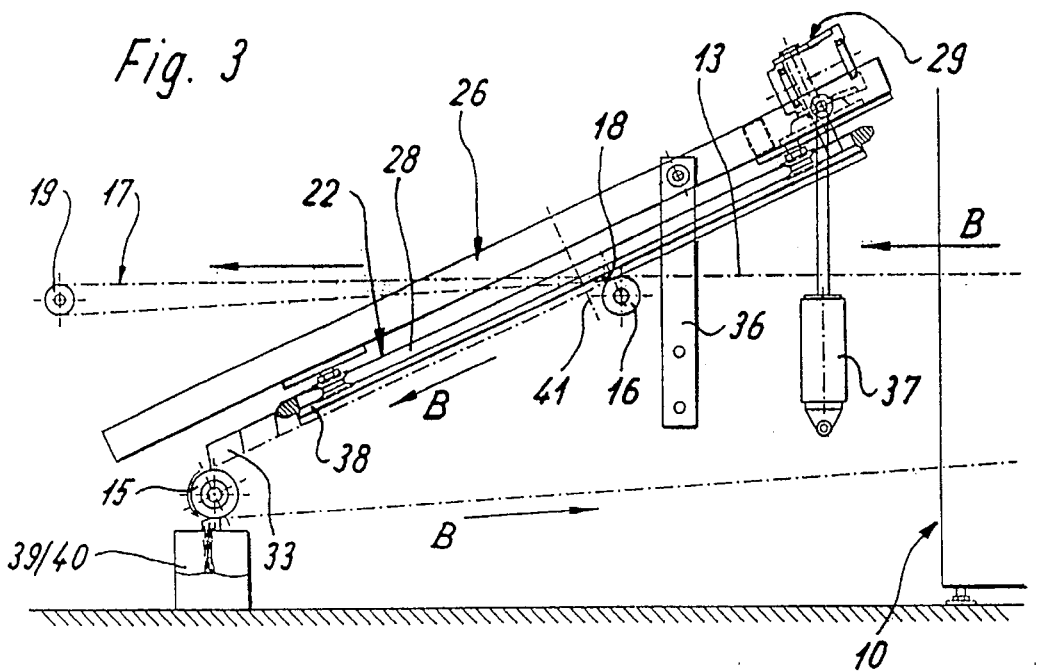
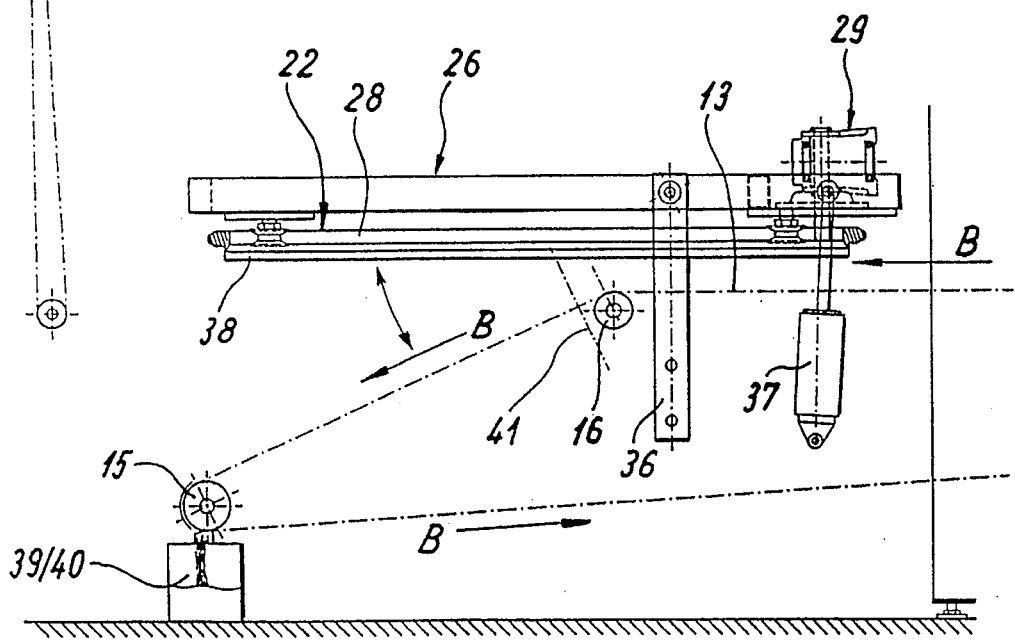

5,597,414

SPRAYER FOR COATING ARTICLES

BACKGROUND OF THE INVENTION

The present invention concerns a sprayer for coating articles with several sprayguns accommodated in an essentially solid-walled spraybooth, wherein a conveyor with a motor-revolved belt conveys the articles through the spraybooth, and a belt-wiping assembly rests against and extends across the belt and wipes its surface clean.

The articles being coated are distributed along the upper strand of the conveyor belt and transported continuously through the spraybooth. The belt is horizontal at least at this point. The articles are coated with lacquer or enamel by the sprayguns. Some of the coating "oversprays," landing on areas of the belt not masked by the articles. The surface of the belt has to be cleaned as soon as each article is removed. It is simultaneously possible to recover the excess coating.

European Patent 0 425 969 A1 describes equipment for cleaning the belt in a coating sprayer of the genus of interest herein. The equipment is positioned in the vicinity of and below the downstream belt-reversing roller. It basically consists of a cylindrical scraper that rotates more rapidly than the roller and in the opposite direction. The axis of the scraper parallels that of the roller. The scraper scrapes off any coating that lands on the belt. The scraper is fairly remote from where the articles leave the booth. This is because thorough cleaning of the belt requires additional equipment for the lower strand as it travels back upstream. The additional equipment occupies additional space. The upper strand must be lengthened by that measure because all the cleaning equipment must be outside the booth. The coating has more time to dry on the belt. The more rapid-drying the coating is and the finer the droplets are, the more difficult it is to scrape off and recover. The downstream equipment must be more powerful and consume more solvent. Another drawback to the known equipment is that, being under the belt, it is time-consuming to maintain. This drawback has to be encountered by a complicated approach involving lowering the equipment below the coating point and removing it at one side to make it accessible for daily cleaning and maintenance. Since the contact between the scraper and the belt is only linear, a single scraping will be insufficient, and the belt will have to be recleaned once or twice. Since the coating scraped off by the scraper flows over the total width of the belt and into a gutter along the side, it must be kept from drying by being repeatedly advanced by a pusher. This approach considerably complicates the overall equipment.

Also known are systems with stationary wipers that extend across the belt. A streak of coating is allowed to form on belts that are then removed at an appropriate point.

One drawback to this very simple solution is that the coating clogs up upstream of the wiper when the belt is moving slowly. Another is that solid particles adhere between the wiper and the belt, scratching the surface.

The coating, but not the scratches, can be prevented from clogging by accelerating the belt. Again, the befit can be accelerated only when there is another conveyor for the intercepted coating. This equipment is accordingly complicated and uses too much solvent.

SUMMARY OF THE INVENTION

The object of the present invention is an improved coating sprayer of the aforesaid genus that will be simple in design and have a more effective means of wiping excess coating off the belt. It will consume much less solvent than known systems. Finally, the belt-wiping assembly will be easily accessible for maintenance.

This object is attained in accordance with the present invention in a coating sprayer of the aforesaid genus by means of the belt-wiping assembly including a wiper that revolves around at least one axis. Since the axis is entirely or almost perpendicular to the surface of the belt, at least some of the wiper's active edge will contact the surface of the belt.

Since the main component of the belt-wiping assembly in accordance with the present invention is a mechanically revolved wiper, the coating will be removed from the belt sooner than at the state of the art and will still be fairly liquid. The coating will not clog up but will flow rapidly and continuously to one side of the belt even though the belt is moving slowly in relation to the automatic spraying devices. The overall width of the belt accordingly depends on how wide the articles being sprayed are and on how much excess is necessary for the coating to streak. It is practical for the wiper to be associated with the upper strand of the belt. This feature saves a lot more solvent or coating or both than known sprayers do because the one wiper immediately intercepts the materials on the surface of the belt and diverts them as intended to the active edge. The revolution also maintains the solvent and coating mixed and prevents the wiper from operating dry. Conservation is also promoted by the inability of the solvent and coating to leak out at the bottom.

The belt resists stress and is made of reinforced plastic. It is at least as wide as the rest of the sprayer. Since it resists stress, the wiper can rest against it forcefully enough to elastically deform it. The belt will according press up against the active edge of the wiper, which will scrape coating off the belt as intended. Solid particles will be swept to the take-off side by the revolutions of the wiper in conjunction with the advance of the belt. The active edge of the wiper is the perpendicular or almost perpendicular edge facing the belt. The invention also accelerates changing from one coating to another because the ropes of coating that form upstream of the wiper are slight enough to remove from the belt very rapidly.

The wiper in another embodiment of the present invention is positioned along the belt near where the articles leave the spraybooth. The upper strand of the belt is diverted toward the lower strand by a roller in the vicinity of wiper. The area of the wiper downstream of the roller is in contact with the diverted section of the belt. This system associates the wiper with the upper strand of the belt, allowing the wiper to be near the spraybooth. The coating will not dry on the belt as extensively and can be wiped off much more easily. Even less solvent will be needed. The roller that diverts the upper strand should be very near the exit from the spray booth. It should be no farther from the exit than design dictates. The belt will accordingly be wiped as soon as possible.

To facilitate inspection and maintenance the area along the upper strand between the upper-strand deflection roller and the first belt-reversing roller is at slight angle to the horizontal.

The coated articles leaving the belt are intercepted and conveyed away by another conveyor, specifically a horizontal conveyor immediately downstream of the upper-strand deflection roller.

It will be practical for the second conveyor to pivot around its downstream reversing roller. It will accordingly be possible to swing the second belt out of the way in order to access the belt-wiping assembly for maintenance.

Maintenance can be further facilitated if the belt-wiping assembly itself pivots around a horizontal axis paralleling that of the upper-strand deflection roller, allowing the wiper to be lowered into an operating position against the sloping section of the upper strand of the belt and raised into a non-operation position away from the belt.

The wiper in one preferred embodiment of the present invention is a revolving wiping ring as wide or almost as wide outside as the belt. The total width of the belt can be wiped by a single revolving wiping ring. Wiping can be further augmented by a lip around the surface of the wiping ring facing the surface of the belt. The design can be simplified by rendering the lip as a thin strip of steel forced over the wiping ring or fitting into a groove.

Further advantageous characteristics and features of the present invention are recited in the claims.

Embodiments of the present invention will now be specified by way of example with reference to the accompanying drawings, wherein

BRIEF DESCRIPTION OF THE DRAWINGS

FIG. 2 is a top view of one version of the belt-wiping assembly employed in a coating sprayer in accordance with the invention, FIG. 3 is a side view of the belt-wiping assembly illustrated in FIG. 2 in an operating position, FIG. 4 illustrates the belt-wiping assembly illustrated in FIG. 2 pivoted into position for maintenance.

DETAILED DESCRIPTION OF THE INVENTION

Figure 1:
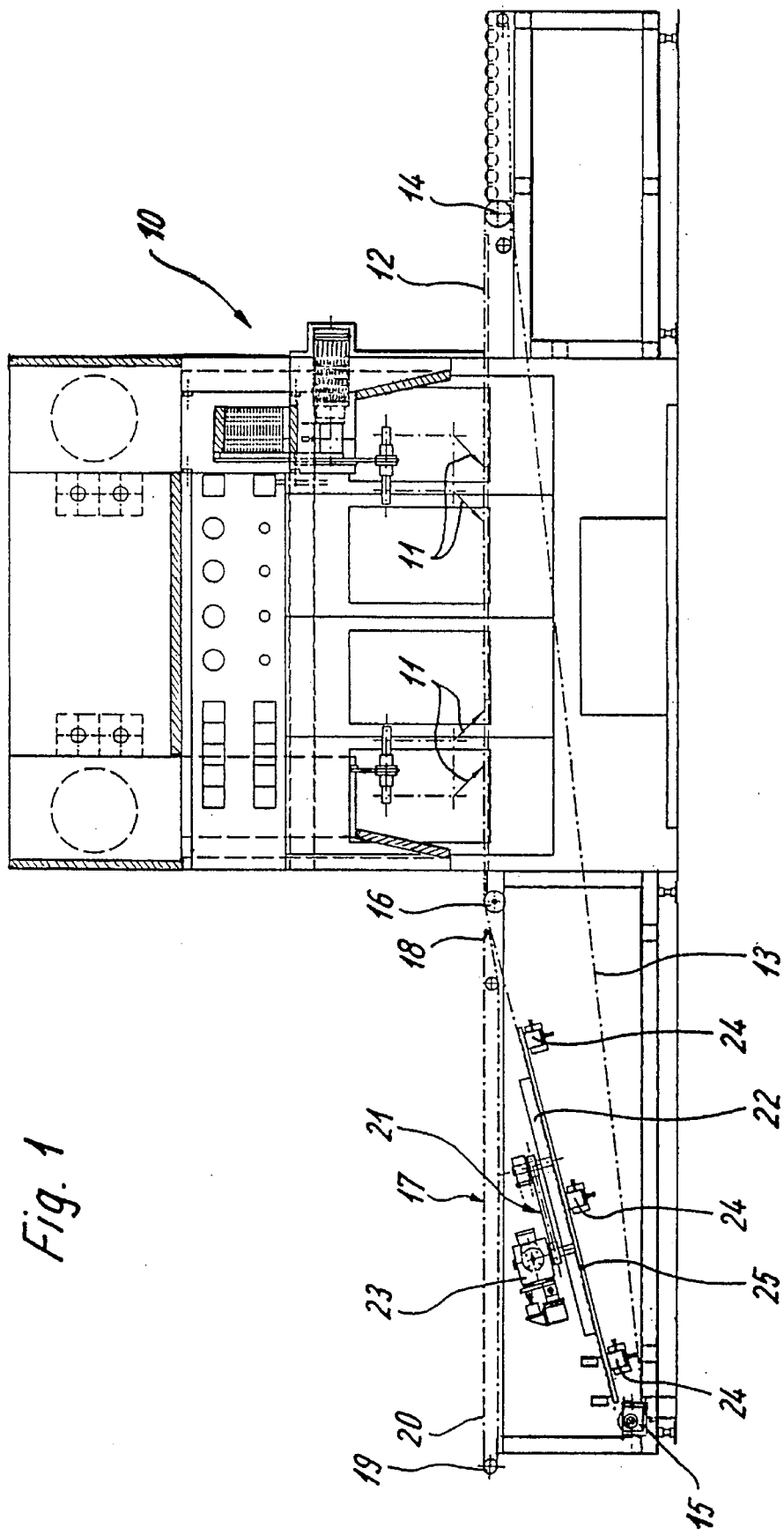
FIG. 1 is a strictly schematic side view of a coating sprayer in accordance with the present invention.

The coating sprayer illustrated in FIG. 1 includes a spraybooth 10 accommodating several sprayguns 11 (represented by the four sloping arrows) and not further specified herein. The sprayer also includes a schematically illustrated conveyor in the form of a belt 13. Unillustrated articles, furniture parts for example, that are to be coated with lacquer or enamel are conveyed through the spraybooth on the horizontal section of the belt's upper strand 12. In addition to belt 13, the conveyor comprises an upstream belt-reversing roller 14, a downstream belt-reversing roller 15, and a roller 16 that deflects upper strand 12 downward. Upper-strand deflection roller 16 is just slightly downstream of spraybooth 10, nearer the booth than upstream belt-reversing roller 14 is. The section of the upper strand 12 of belt 13 between upper-strand deflection roller 16 and downstream belt-reversing roller 15 is accordingly deflected from the horizontal. Directly adjacent to the horizontal section of the upper strand is another conveyor 17. Conveyor 17 is entirely horizontal and intercepts and conveys away the coated articles leaving the first conveyor. Second conveyor 17 comprises several separate straps 20 revolved by a roller 19 around a knife-edge producing belt-reversing roller 18 at the end next to spraybooth 10. Belt 13 is wiped clean by a belt-wiping assembly 21 that accommodates a revolving wiper 22. Belt-wiping assembly 21 will be specified hereinafter with reference to FIGS. 2 through 11. Wiper 22 is revolved by a motorized mechanism 23. Belt 13 rests in the vicinity of belt-wiping assembly 21 against a sheet 25 of metal secured on transverse arms 24.

The belt-wiping assembly 21 illustrated in FIGS. 2 through 4 comprises a frame 26 that will not be specified herein. Wiper 22 revolves on frame 26. The wiper is secured by four wheels 27 distributed at angles of 90° around it. The wiper 22 in this particular embodiment is a revolving wiping ring 28. The wiping ring is revolved by friction by a motor 29. The wiping ring illustrated in FIG. 2 revolves clockwise in the direction indicated by the arrow A. Belt 13 travels in the direction indicated by arrow B. Just inside the edge of wiping ring 28 are two adjacent nozzles 30 and 31. Directly downstream of wiping ring 28 are two parallel wiping blades 32 and 33. Wiping blades 32 and 33 extend at an angle to the direction B of belt 13 on the same side as nozzles 30 and 31. Another nozzle 30a is associated with wiping blade 32 and another nozzle 31a with wiping blade 33. Each nozzle 30, 30a, 31, and 31a can spray either coating or solvent. Wiping blades 32 and 33 extend at an angle that ensures that the ends facing nozzles 30a and 31a will be farther upstream. There is still another wiper 34 extending across the edge of wiping ring 28 opposite nozzles 30 and 31. Wiper 34 wipes the inside of the wiping ring and the adjacent surface of belt 13. Mounted at the same side of the sprayer as inner-surface wiper 34 is still another wiper 35 that wipes the outside of the wiping ring and the adjacent area of belt 13. The belt is intentionally depressed at this point to create a gutter for the wiped-off lacquer or enamel to flow off through. The recovered coating accumulates in the rope indicated by the hatching along the edge of belt 13. The two slanting wiping blades 32 and 33 will rewipe and thoroughly clean the belt. Whether both wiping blades are used depends on the type of coating. As will be evident from FIG. 2, the coating wiped off by wiping blades 32 and 33 will be advanced in the form of a rope along the front, arriving at the edge opposite nozzles 30a and 31.

FIG. 3 illustrates belt-wiping assembly 21 in operation. Wiping ring 28 is at or approximately at the same angle to the horizontal as the section of the upper strand 12 of belt 13 between upper-strand deflection roller 16 and downstream belt-reversing roller 15. It will be evident from this figure in conjunction with FIG. 2 that the downstream semicircle of wiping ring 28 is its active surface. The two parallel longitudinal struts of frame 26 rotate on two uprights 36. Uprights 36 are screwed to an unillustrated bench. Frame 26 and hence the overall belt-wiping assembly 21 rotate around a point above the upper strand 12 of belt 13. At the end facing spraybooth 10 the frame is engaged by the piston rod of a piston-and-wiping cylinder mechanism 37. Piston-and-wiping cylinder mechanism 37 is the mechanism that revolves the frame 26 of belt-wiping assembly 21. It is also mounted on the unillustrated bench. As will be evident from FIG. 3, second conveyor 17 constitutes a straight extension of the horizontal section of the upper strand 12 of belt 13 when belt-wiping assembly 21 is in the operating position.

It will be evident from FIGS. 3 and 4 that wiping ring 28 has a lip 38 around the side facing belt 13. The piston rod in mechanism 37 is introduced in order to pivot belt-wiping assembly 21 into the maintenance position illustrated in FIG. 4, pivoting wiper 22 clockwise once second conveyor 17 has been pivoted counterclockwise by an unillustrated mechanism into a vertical position. It will also be evident from FIG. 2 that second conveyor 17 is slightly narrower than the inside diameter of wiping ring 28 is long, so that the area adjacent to upper-strand deflection roller 16 extends into the wiping ring. This is possible because of the slope of belt-wiping assembly 21.

FIGS. 2 and 3 also show that the ends of wiping blades 32 and 33 facing nozzles 30a and 31a are mutually displaced to the extent that the upstream wiper 35 is nearer the outer edge of the conveyor than wiping blade 33 is. This makes it possible to collect the coating in one tank 39 and the solvent in another tank 40. It will be evident from the figures that the axis of wiper 22 is perpendicular to the sloping section of the upper strand 12 of belt 13. In the illustrated embodiment it is within the sloping section. It could on the other hand be outside it.

Figure 5:
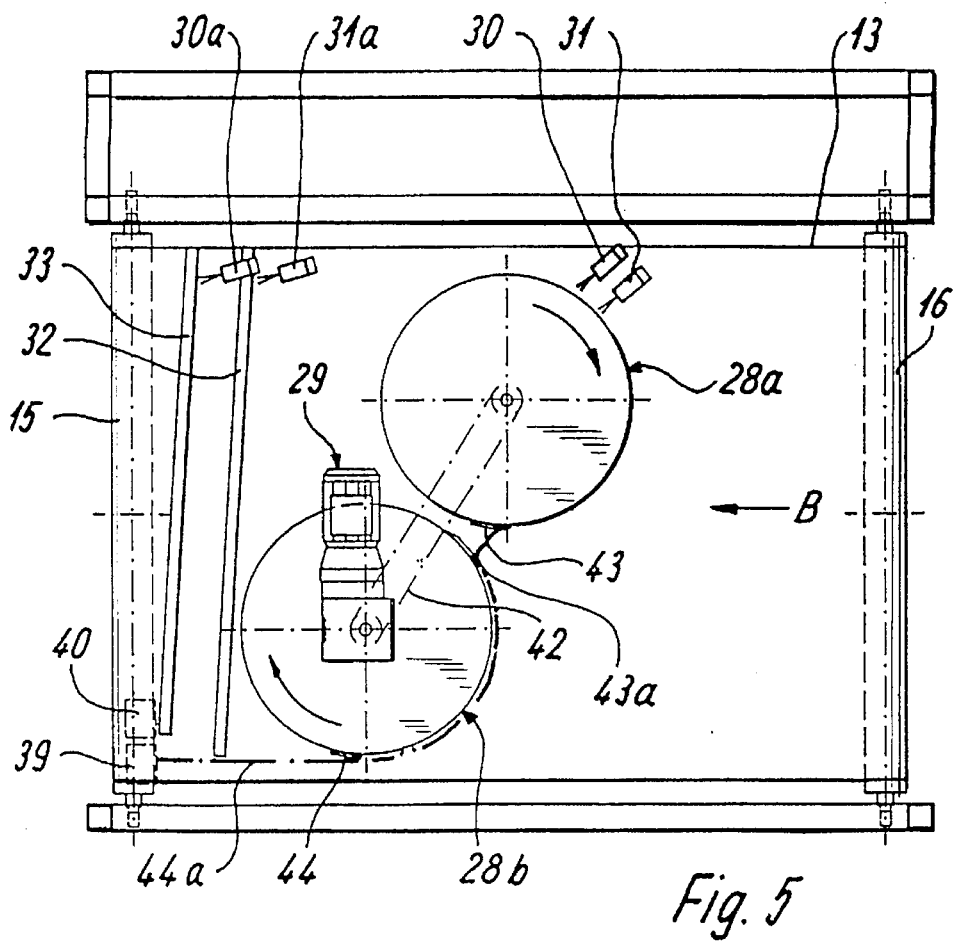
FIG. 5 is a top view of another version of the belt-wiping assembly.
Figure 6:
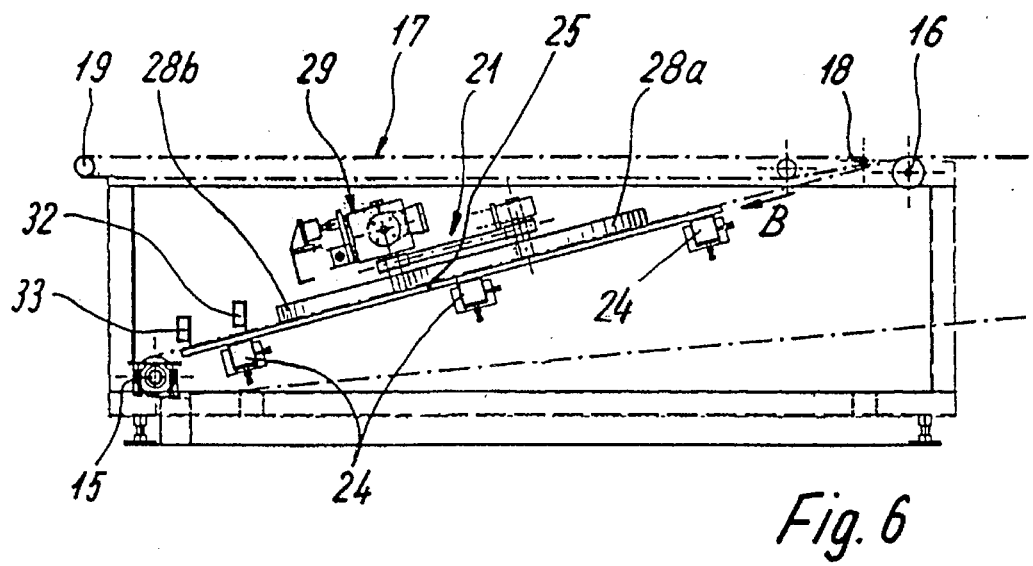
FIG. 6 is a side view of the belt-wiping assembly illustrated in FIG. 5.

The wiper 22 in the embodiment illustrated in FIGS. 5 and 6 comprises two wiping rings 28a and 28b that extend all the way across belt 13. Wiping rings 28a and 28b are revolved in the same sense by a chain or strap 42. The distance between their two centers is less than the outside diameter of wiping ring 28a or 28b. The result is an overlap at the midpoint of belt 13 due to the mutual displacement of the centers along belt 13. The sprayer is also equipped with nozzles 30, 30a, 31, and 31a for applying solvent or coating. These nozzles are also positioned at the edge of belt 13. At the side facing away from nozzles 30, 30a, and 31a each wiping ring 28a and 28b provided with a vertical stripper 43 and 44 that strips the wiped-off coating off the outside of wiping rings 28a and 28b. Due to the revolutions of wiping rings 28a and 28b and the advance of belt 13, the wiped-off material will be conveyed in the form of a rope in front of the circumferences of wiping rings 28a and 28b.

The material 43a stripped off of wiping ring 28a will accordingly arrive in front of downstream wiping ring 28b and hence in the form of a rope 44a in tank 39. Lacquer or enamel will be supplied through nozzles 31 and 31a to provide a mist that protects the contacting surfaces. The additional material wiped off by wiping blade 33 arrives in tank 40 due to the downward slope. The pivoting motion of belt-wiping assembly 21 is for simplicity's sake not illustrated.

Figure 7:
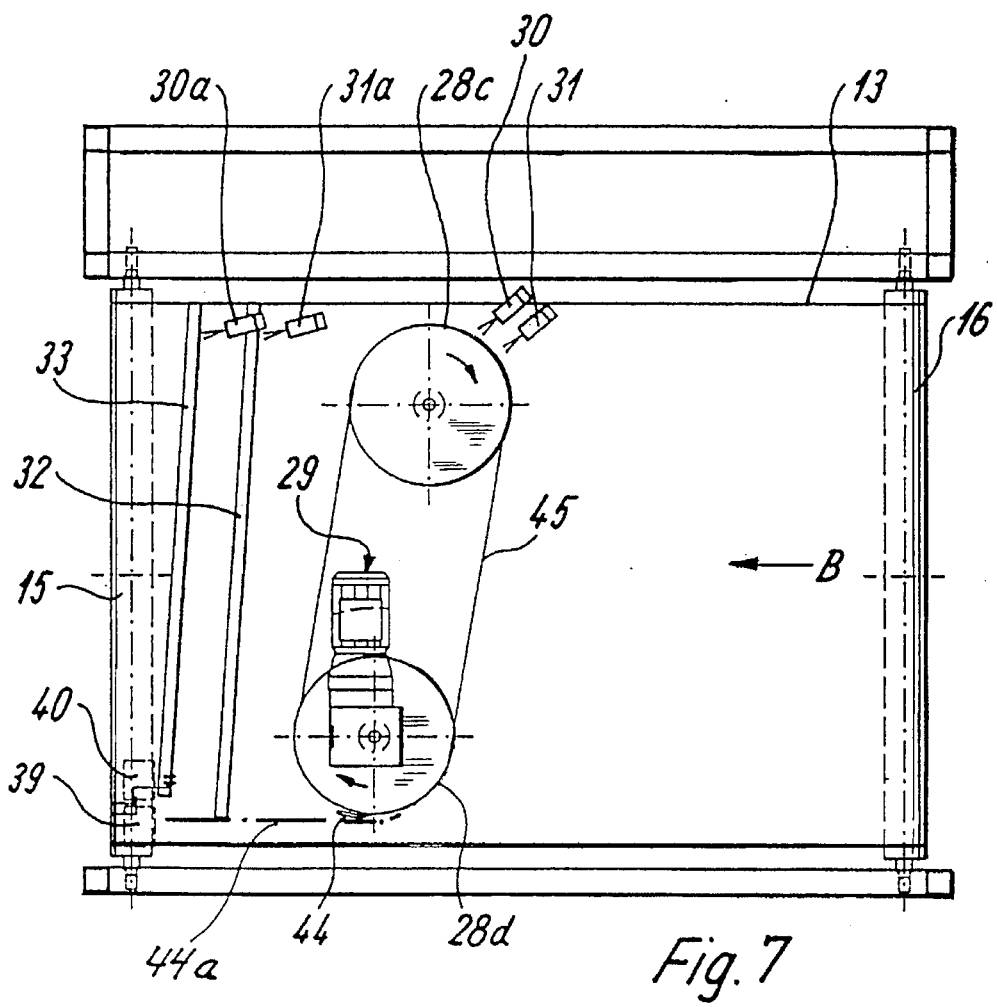
FIG. 7 is a top view of a third version of the belt-wiping assembly.
Figure 8:
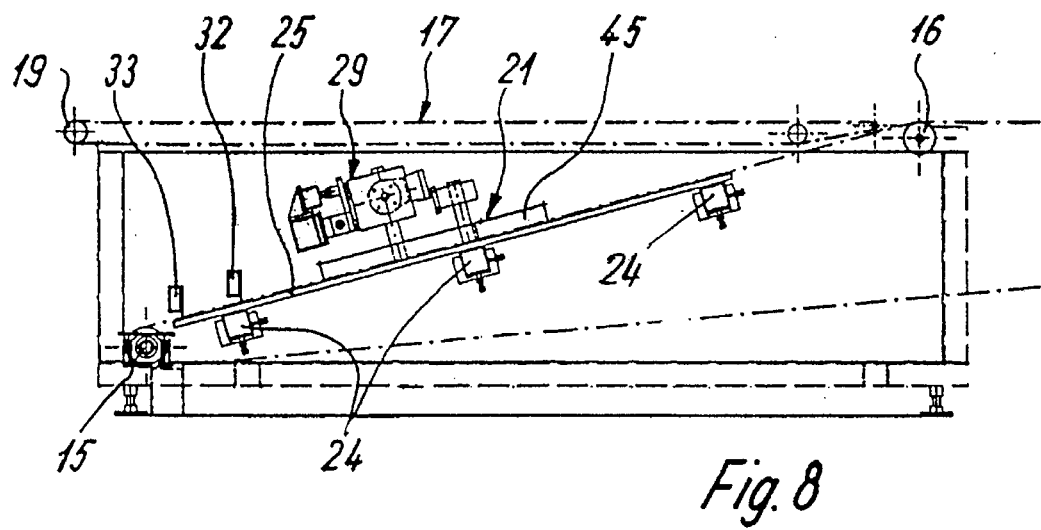
FIG. 8 is a side view of the belt-wiping assembly illustrated in FIG. 7.

The belt-wiping assembly 21 in the embodiment illustrated in FIGS. 7 and 8 is also provided with two wiping rings 28c and 28d. Wiping rings 28c and 28d are narrower than belt 13. Their centers are again mutually displaced. To ensure that the total width of belt 13 can be cleaned, a steel strip 45 is wrapped tight around the wiping rings. The lower edge of the strip projects toward the faces of the wiping rings facing belt 13 so that only the face of steel strip 45 contacts the surface of belt 13. The system otherwise corresponds to those illustrated in FIGS. 5 and 6. Only one stripper 44, however, is necessary, and it is on the side opposite nozzles 30a, 31, and 31a. The material in this embodiment as well accumulates in the form of a rope in front of the upstream strand of steel strip 45. Stripper 44 strips material from the outside of steel strip 45 and the material accumulates again in the form of a rope against the edge of belt 13, whence it is intercepted by tank 39.

Figure 9:
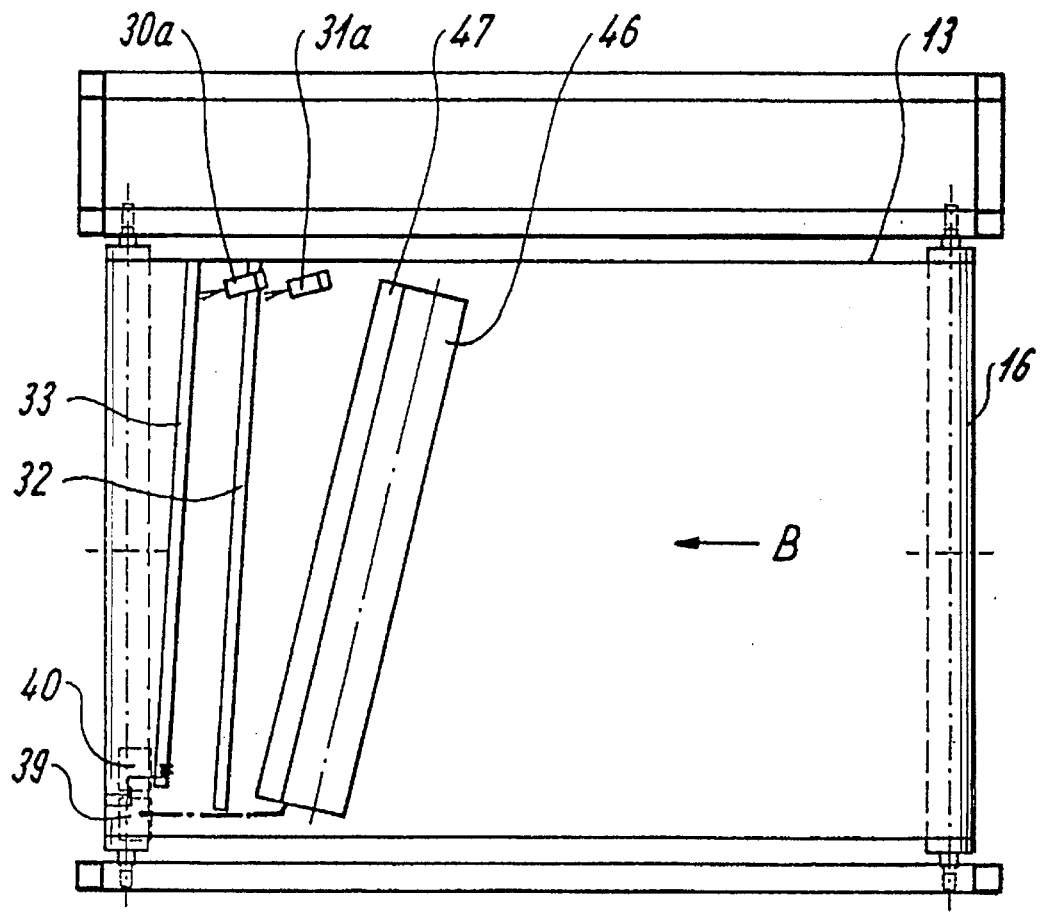
FIG. 9 is a top view of an accessory employed downstream of the wiper assemblies illustrated in FIGS. 2 through 8.
Figure 10:
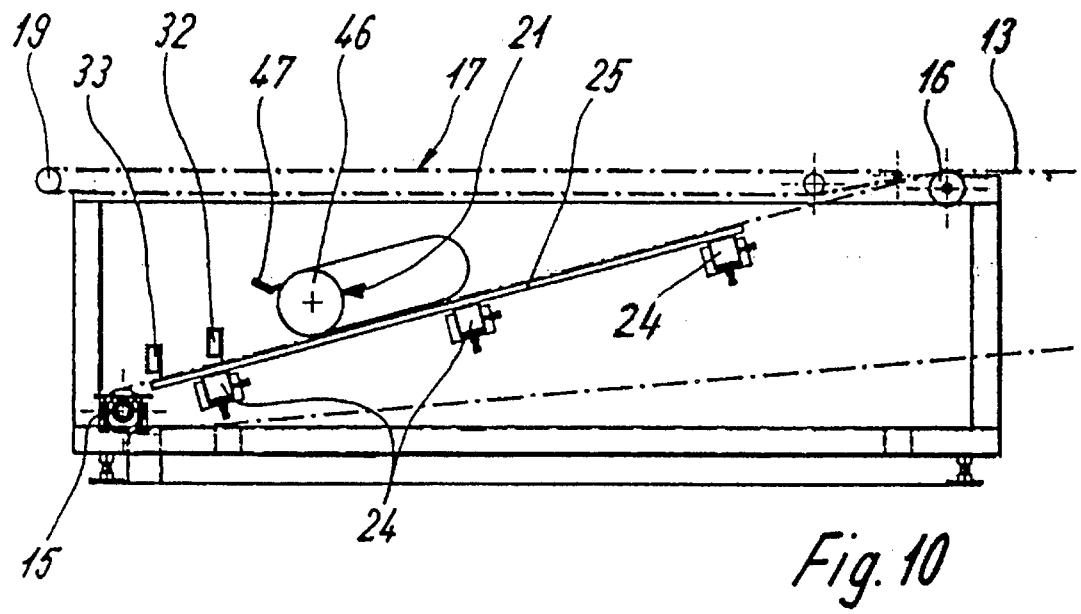
FIG. 10 is a side view of the accessory illustrated in FIG. 9.

The wiper in the assembly 21 illustrated in FIGS. 9 and 10 is a rotating wiping cylinder 46 instead of a pivoting wiper. Wiping cylinder 46 rests against belt 13. The wiping cylinder is attached between downstream belt-reversing roller 15 and upper-strand deflection roller 16 and accordingly at the sloping upper strand of belt 13. The axis of rotation is also at an angle to the edges of belt 13, with the face of the wiping cylinder that faces away from nozzles 30a, 31a farther downstream. The angle is accordingly comparable to that of wiping rings 28a through 28d. Wiping cylinder 46 rotates opposite upper-strand deflection roller 16 and downstream belt-reversing roller 15. The material intercepted by wiping cylinder 46 is removed by a blade 47 mounted on it. The embodiment illustrated in FIGS. 9 and 10 is employed when the particular lacquer or enamel is particularly easy to clean. The wiped-off material falls subject to gravity in this case as well in the form of a rope to the edge of belt 13 opposite nozzles 30a and 31a and thence into tank 39.

The wiping blades 32 and 33 in FIGS. 2 through 10 can be considered as carrying out a mopping-up or wiping-clean operation. The wiping rings 28a and 28b in FIGS. 5 and 6 can also be wrapped with a strip of steel with its lower surface, the surface facing belt 13, that is, projecting beyond the face of each wiping ring.

Figure 11:
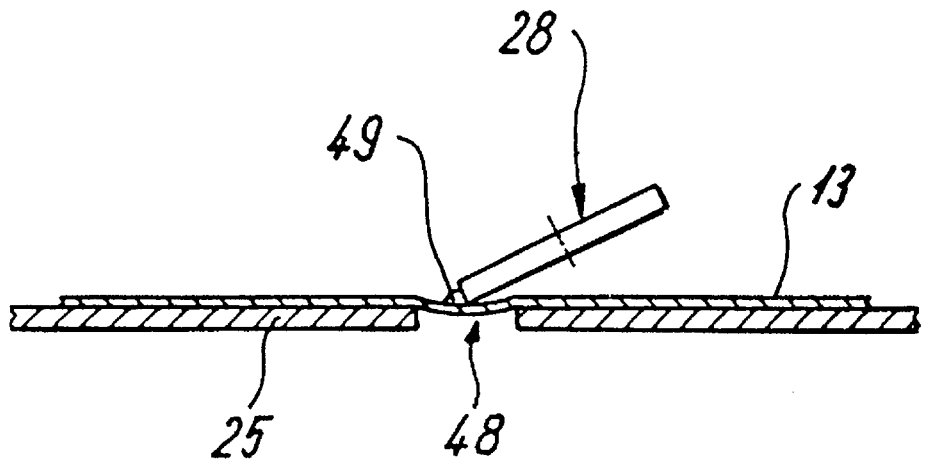
FIG. 11 is a detail illustrating how the belt elastically deforms.
Figure 12:
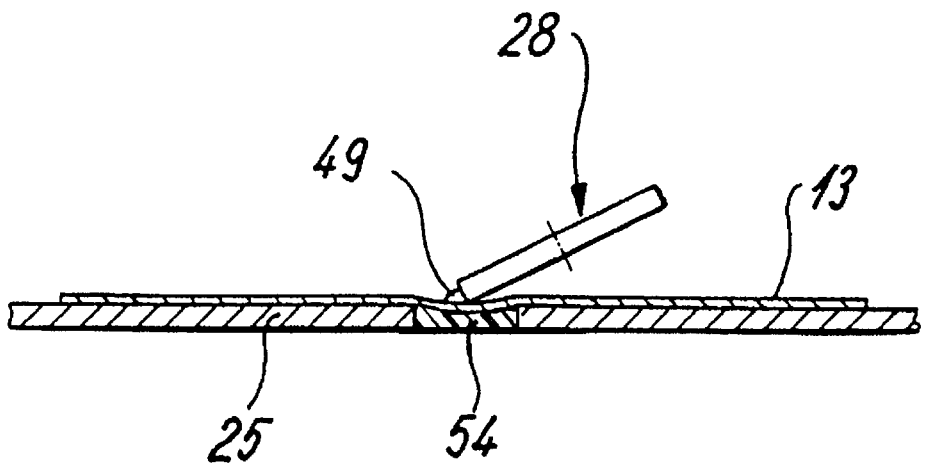
FIG. 12 is a detail illustrating how another version of the belt deforms.

As will be evident from FIGS. 11 and 12, metal sheet 25 has a slot 48 where it rests against wiping ring 28, and the slight angle of the wiping ring elastically deforms the belt. The belt will accordingly be tensioned against the wiping ring. The streak 49 of lacquer that is to be removed in accordance with the invention accumulates in the resulting depression. The angle is exaggerated in the figures for purposes of illustration.

The slot 48 in the embodiment illustrated in FIG. 12 is packed with elastically deforming filler 54 to increase resistance to wiper 22 as well as the tightness of the seal between wiper 22 and the belt.

Figure 13:
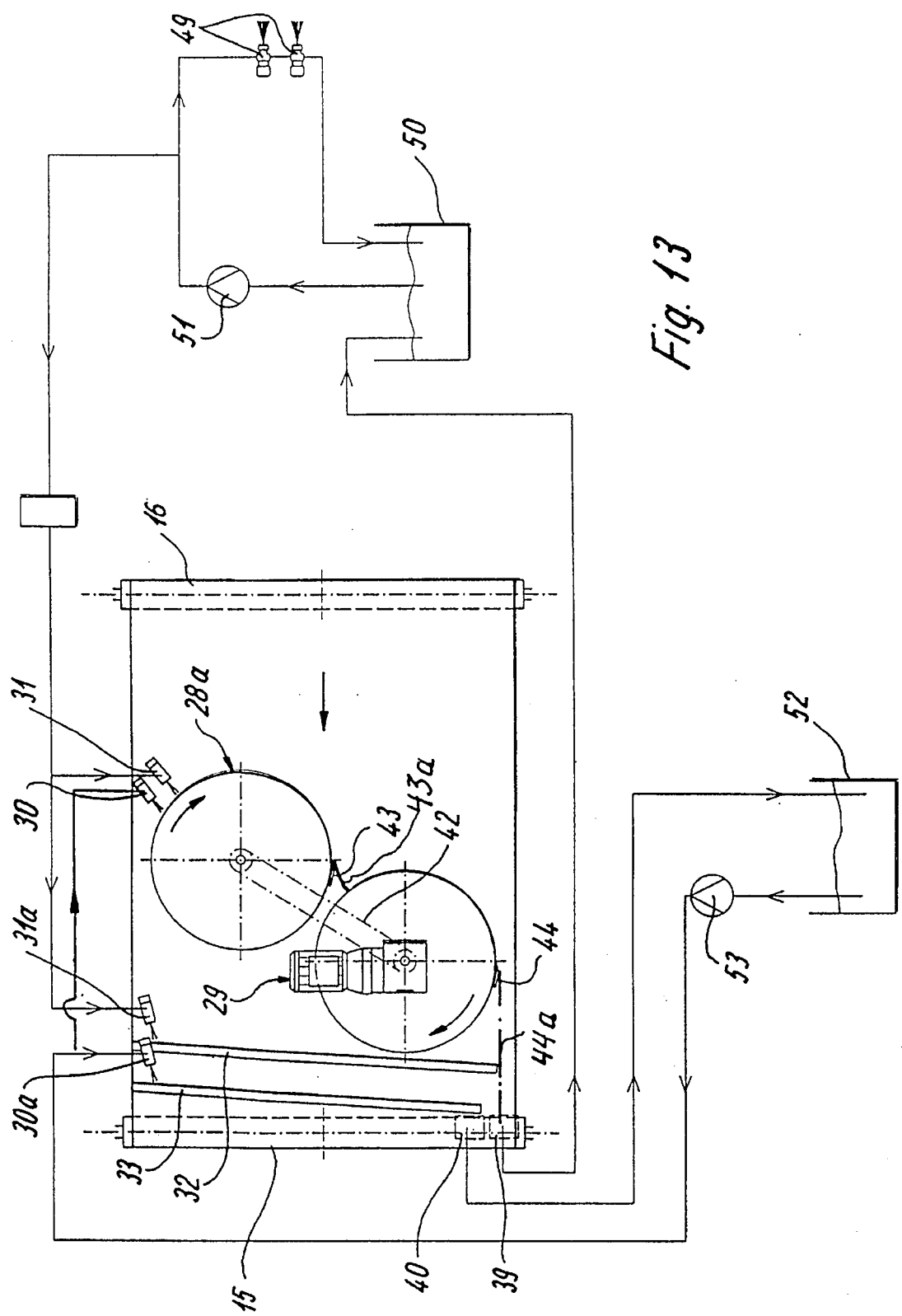
FIG. 13 is a flow chart illustrating recovery of the coating and solvent.

The recycling of lacquer or enamel and solvent in the embodiments illustrated in FIGS. 5 and 6 will now be specified with reference to FIG. 13. Spraybooth 10 accommodates sprayguns 49. Lacquer or enamel is obtained from a reservoir 50, any excess being returned to the reservoir. The coating is circulated by a pump 51 in the supply line. Another line branches off from the supply line and leads to nozzles 31 and 31a. Nozzles 31 and 31a spray coating onto belt 13 in the vicinity of belt-wiping assembly 21. Coating intercepted by tank 39 is pumped back to reservoir 50. The equipment also includes a solvent reservoir 52. Solvent is supplied by a pump 53 in the solvent line to nozzles 30 and 30a. The solvent recovered from belt 13 arrives in tank 40. The excess is returned to solvent reservoir 52 by way of a line.

What is claimed is:

1. A sprayer for coating articles, comprising: a plurality of sprayguns accommodated in a substantially solid-walled spraybooth, a conveyor with a motor-revolved belt for conveying articles through the spraybooth, belt-wiping means resting against and extending across the belt for wiping a surface of the belt clean, wherein the belt-wiping means includes at least one wiping ring mounted for rotation around an axis and having an active edge and wherein the axis is at least substantially perpendicular to the surface of the belt such that at least a portion of the wiper's active edge will contact the surface of the belt, a motor for rotating the at least one wiping ring and at least three wheels for positioning the at least one wiping ring.

2. The sprayer as in claim 1, wherein the spraybooth has an outlet and the at least one wiping ring is positioned along the belt near the outlet, wherein the belt has an upper strand and a lower strand and wherein the upper strand of the belt is diverted toward the lower strand by a deflection roller, and an area of the at least one wiping ring is positioned downstream of the roller and in contact with a diverted section of the belt.

3. The sprayer as in claim 2, wherein a diverted section along the upper strand between the upper-strand deflection roller and a first belt-reversing roller is at an angle to the horizontal.

4. The sprayer as in claim 2, further comprising a horizontal conveyor immediately downstream of the upper-strand deflection roller for intercepting and conveying away coated articles leaving the belt.

5. The sprayer as in claim 4, further comprising means to pivot the horizontal conveyor around a downstream reversing roller.

6. The sprayer as in claim 2, wherein the belt-wiping means has means to pivot around a horizontal axis paralleling an axis of the upper-strand deflection roller, to allow the at least one wiper ring to be lowered into an operating position against a sloping section of the upper strand of the belt and raised into a non-operation position away from the belt.

7. The sprayer as in claim 1, wherein the at least one wiping ring has an outside diameter substantially as wide as the belt.

8. The sprayer as in claim 7, further comprising a lip extending around and connected to a surface of the at least one wiping ring facing the surface of the belt.

9. The sprayer as in claim 8, wherein the lip is a strip of steel connected by a force fit over the at least one wiping ring or a fit into a groove in the surface thereof.

10. The sprayer as in claim 7, further comprising two nozzles adjacent the at least one wiping ring at one side of the belt for spraying lacquer or enamel and for spraying a solvent and two wipers on the opposite side of the belt including one wiper for wiping off an inside surface of the at least one wiping ring and another wiper for wiping off an outside surface of the at least one wiping ring.

11. The sprayer as in claim 1, wherein the belt-wiping means comprises two wiping rings mounted for rotation in the same direction with their centers longitudinally displaced along the belt.

12. The sprayer as in claim 11, wherein an outer diameter of each wiping ring is wider overall than halfway across the belt and centers thereof are separated by less than the overall width of a wiping ring, so that the wiping rings overlap in coverage of the belt.

13. The sprayer as in claim 11, wherein the outer diameter of each wiping ring is narrower than halfway across the belt and further comprising a strip of steel wrapped around the two rings for wiping the belt.

14. The sprayer as in claim 11, wherein at least one wiping ring has a stripper.

15. The sprayer as in claim 1, further comprising at least one scraper downstream of the at least one wiping ring.

16. The sprayer as in claim 15, further comprising two separated wipers adjacent the at least one wiping ring and a nozzle adjacent each wiper and wherein ends of the wipers opposite the nozzles are longitudinally displaced.

17. The sprayer as in claim 16, wherein one end of a downstream wiper of the two separated wipers is longitudinally displaced from one end of an upstream wiper of the two separate wipers toward the two nozzles.

18. A sprayer for coating articles, comprising: a plurality of sprayguns accommodated in substantially solid-walled spraybooth, a conveyor with a motor-revolved belt for conveying the articles through the spraybooth, belt-wiping means extending across the belt and wiping a surface of the belt clean, wherein the belt-wiping means comprises a wiping cylinder resting against and extending across the belt, wherein an upper strand of the belt is deflected toward a lower strand by an upper-strand deflection roller, and wherein the wiping cylinder is mounted between the upper-strand deflection roller and a downstream belt-reversing roller and has a longitudinal axis which extends at a non-perpendicular angle to edges of the belt and further comprising a scraper extending along the wiping cylinder for removing material intercepted by the wiping cylinder.

19. The sprayer as in claim 18, wherein the wiping cylinder is mounted for rotation opposite the direction of rotation of the upper-strand deflection roller and the downstream belt-reversing roller.

20. The sprayer as in claim 18, further comprising two wiping blades parallel to the wiping cylinder, a nozzle associated with an end of each wiping blade, and wherein an end of a downstream wiping blade of the two wiping blades is longitudinally displaced toward the nozzles from the end of an upstream wiping blade of the two wiping blades.

21. The sprayer as in claim 18, further comprising a metal sheet resting against the upper strand of the belt adjacent the wiping cylinder.

22. The sprayer as in claim 21, wherein the metal sheet has a slot where the wiping cylinder contacts the belt.

23. The sprayer as in claim 22, wherein the slot is packed with an elastically deforming filler.

24. The sprayer as claim 18, further comprising nozzles in the spraybooth that emit lacquer or enamel and supplied through a first pipeline in communication with a second pipeline that supplies the sprayguns in the spraybooth.

25. The sprayer as in claim 18, further comprising nozzles in the spraybooth that emit solvent in communication with a reservoir and wherein solvent is recovered from the spraybooth in a tank and returned to the reservoir.

26. The sprayer as in claim 1, wherein the at least one wiping ring is mounted to rest against and extend across an upper surface of the belt.

* * * * *